(12) United States Patent
Park et al.

(10) Patent No.: US 10,708,910 B2
(45) Date of Patent: Jul. 7, 2020

(54) METHOD FOR TRANSMITTING SOUNDING REFERENCE SIGNAL IN WIRELESS COMMUNICATION SYSTEM AND APPARATUS FOR SUPPORTING SAME

(71) Applicant: LG ELECTRONICS INC., Seoul (KR)

(72) Inventors: Hanjun Park, Seoul (KR); Yunjung Yi, Seoul (KR); Eunsun Kim, Seoul (KR); Suckchel Yang, Seoul (KR); Hyunho Lee, Seoul (KR); Daesung Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 141 days.

(21) Appl. No.: 16/073,473

(22) PCT Filed: Feb. 6, 2017

(86) PCT No.: PCT/KR2017/001256
§ 371 (c)(1),
(2) Date: Jul. 27, 2018

(87) PCT Pub. No.: WO2017/135773
PCT Pub. Date: Aug. 10, 2017

(65) Prior Publication Data
US 2019/0037562 A1 Jan. 31, 2019

Related U.S. Application Data

(60) Provisional application No. 62/359,215, filed on Jul. 7, 2016, provisional application No. 62/291,550, filed on Feb. 5, 2016.

(51) Int. Cl.
*H04W 72/04* (2009.01)
*H04L 5/00* (2006.01)
*H04L 27/26* (2006.01)

(52) U.S. Cl.
CPC .......... *H04W 72/0446* (2013.01); *H04L 5/00* (2013.01); *H04L 5/0048* (2013.01);
(Continued)

(58) Field of Classification Search
None
See application file for complete search history.

(56) References Cited

U.S. PATENT DOCUMENTS

2009/0238241 A1 9/2009 Hooli et al.
2010/0246638 A1* 9/2010 Mehta .................... H04B 1/713
375/133

(Continued)

OTHER PUBLICATIONS

Ericsson, "Physical Layer Aspects of Short TTI for Uplink Transmissions," 3GPP TSG RAN WG1 Meeting #83, R1-157149, Anaheim, USA, Nov. 15-22, 2015, pp. 1-4.

(Continued)

*Primary Examiner* — Shripal K Khajuria
(74) *Attorney, Agent, or Firm* — Birch, Stewart, Kolasch & Birch, LLP

(57) ABSTRACT

Disclosed are a method for transmitting a sounding reference signal to a base station by a terminal and an apparatus for supporting the same. Particularly, disclosed is a sounding reference signal transmission method comprising: determining a transmission time point of a first SRS within a first TTI, which has a length shorter than the length of one subframe, on the basis of the first TTI; and transmitting the first SRS at the determined transmission time point, wherein a frequency resource at which the first SRS is transmitted is configured independently from a frequency resource at which a second SRS based on a second TTI having a length corresponding to the length of one subframe is transmitted.

14 Claims, 9 Drawing Sheets

(52) U.S. Cl.
    CPC ......... *H04L 5/0051* (2013.01); *H04W 72/042* (2013.01); *H04L 5/0078* (2013.01); *H04L 27/2613* (2013.01); *H04W 72/0453* (2013.01)

(56) References Cited

U.S. PATENT DOCUMENTS

| | | | |
|---|---|---|---|
| 2015/0016489 A1 | 1/2015 | Mehta et al. | |
| 2015/0092637 A1* | 4/2015 | Yang | H04B 7/2656 370/296 |
| 2016/0227602 A1* | 8/2016 | Yi | H04W 48/16 |
| 2016/0278050 A1* | 9/2016 | Nory | H04L 27/0006 |
| 2017/0215188 A1* | 7/2017 | Kim | H04L 1/18 |
| 2018/0192321 A1* | 7/2018 | Sahlin | H04L 5/0005 |

OTHER PUBLICATIONS

Huawei et al., "Discussion on DL RS and UL RS for Short TTI," 3GPP TSG RAN WG1 Meeting #83, R1-156460, Anaheim, USA, Nov. 15-22, 2015, 4 pages.

Interdigital Communications, "Support for Short TTIs and Processing Times in LTE," 3GPP TSG-RAN WG1 #83, Tdoc R1-157136, Anaheim, USA, Nov. 16-20, 2015, pp. 1-6.

\* cited by examiner $S_1 = \{SRS\ seq_1, CS_1, SRS\ BW_1, \cdots\}$ $S_2 = \{SRS\ seq_2, CS_2, SRS\ BW_2, \cdots\}$

METHOD FOR TRANSMITTING SOUNDING REFERENCE SIGNAL IN WIRELESS COMMUNICATION SYSTEM AND APPARATUS FOR SUPPORTING SAME

CROSS REFERENCE TO RELATED APPLICATIONS

This application is the National Phase of PCT International Application No. PCT/KR2017/001256, filed on Feb. 6, 2017, which claims priority under 35 U.S.C. 119(e) to U.S. Provisional Application No. 62/291,550, filed on Feb. 5, 2016 and 62/359,215, filed on Jul. 7, 2016, all of which are hereby expressly incorporated by reference into the present application.

TECHNICAL FIELD

The following description relates to a wireless communication system and, more particularly, to a method of transmitting a sounding reference signal from a user equipment (UE) to a base station in a wireless communication system, and an apparatus supporting the same.

In particular, the following description relates to a method of transmitting a sounding reference signal based on a transmission time interval (TTI) having a length smaller than one subframe.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide a method of transmitting a sounding reference signal from a user equipment (UE) to a base station.

In particular, an object of the present invention is to provide a method of transmitting a sounding reference signal based on a TTI having a length smaller than one subframe differently from a conventional sounding reference signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method of transmitting a sounding reference signal from a user equipment (UE) to a base station in a wireless communication system, and an apparatus supporting the same.

The object of the present invention can be achieved by providing a method of transmitting a sounding reference signal (SRS) from a user equipment (UE) to a base station in a wireless communication system including determining a transmission time point of a first SRS within a first transmission time interval (TTI) based on the first TTI having a length smaller than that of one subframe and transmitting the first SRS at the determined time point, wherein a frequency resource in which the first SRS is transmitted is configured independently of a frequency resource in which a second SRS is transmitted based on a second TTI having a length corresponding to that of one subframe.

In another aspect of the present invention, provided herein is a user equipment (UE) for transmitting a sounding reference signal (SRS) to a base station in a wireless communication system including a reception unit, a transmission unit, and a processor connected to the reception unit and the transmission unit to operate, wherein the processor is configured to determine a transmission time point of a first SRS within a first transmission time interval (TTI) based on the first TTI having a length smaller than that of one subframe and to transmit the first SRS at the determined time point, and wherein a frequency resource in which the first SRS is transmitted is configured independently of a frequency resource in which a second SRS is transmitted based on a second TTI having a length corresponding to that of one subframe.

The transmission time point of the first SRS may be a latest symbol in a time domain among symbols included in the first TTI.

The transmission time point of the first SRS may be indicated through downlink control information (DCI) or a higher layer signal received from the base station.

The frequency resource in which the first SRS is transmitted may not overlap the frequency resource in which the second SRS is transmitted.

When a modulated reference signal is further transmitted at the transmission time point of the first SRS, the first SRS and the modulated reference signal may be cyclic-shifted, multiplexed and transmitted.

When the frequency resource in which the first SRS is transmitted includes a limited frequency band, a sequence of the first SRS included in the limited frequency band may be punctured and then transmission may be performed.

The first SRS may be frequency-hopped within set SRS system bandwidth and then may be transmitted.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

As is apparent from the above description, the embodiments of the present disclosure have the following effects.

According to the present invention, a UE can transmit a sounding reference signal based on a TTI having a length smaller than a conventional one.

In particular, the UE can transmit a sounding reference signal based on a TTI having a length smaller than the conventional one in order to provide backward compatibility with a legacy LTE system.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE

Figure 1:
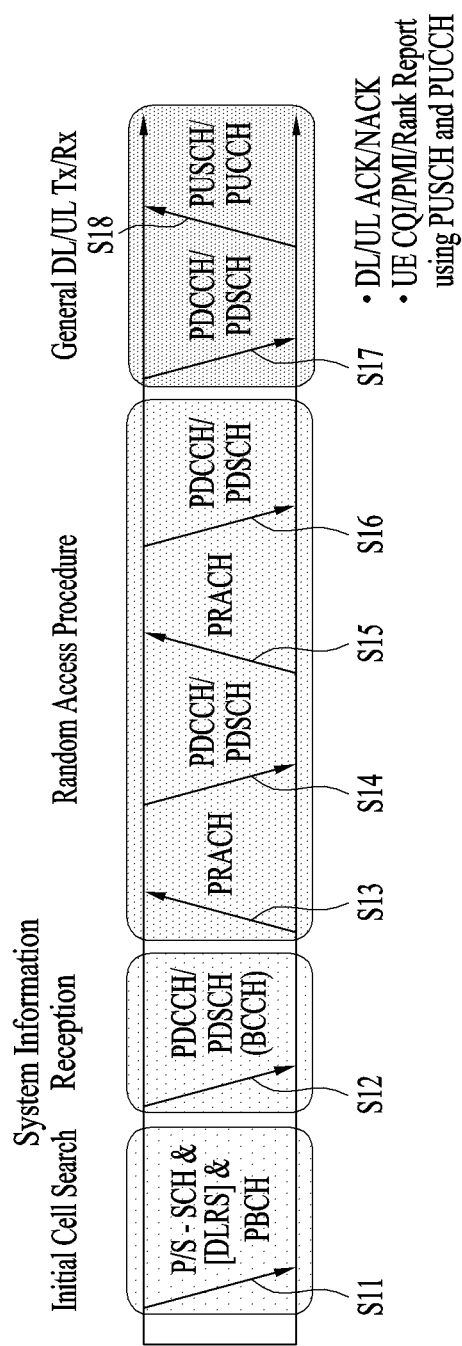
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), and CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
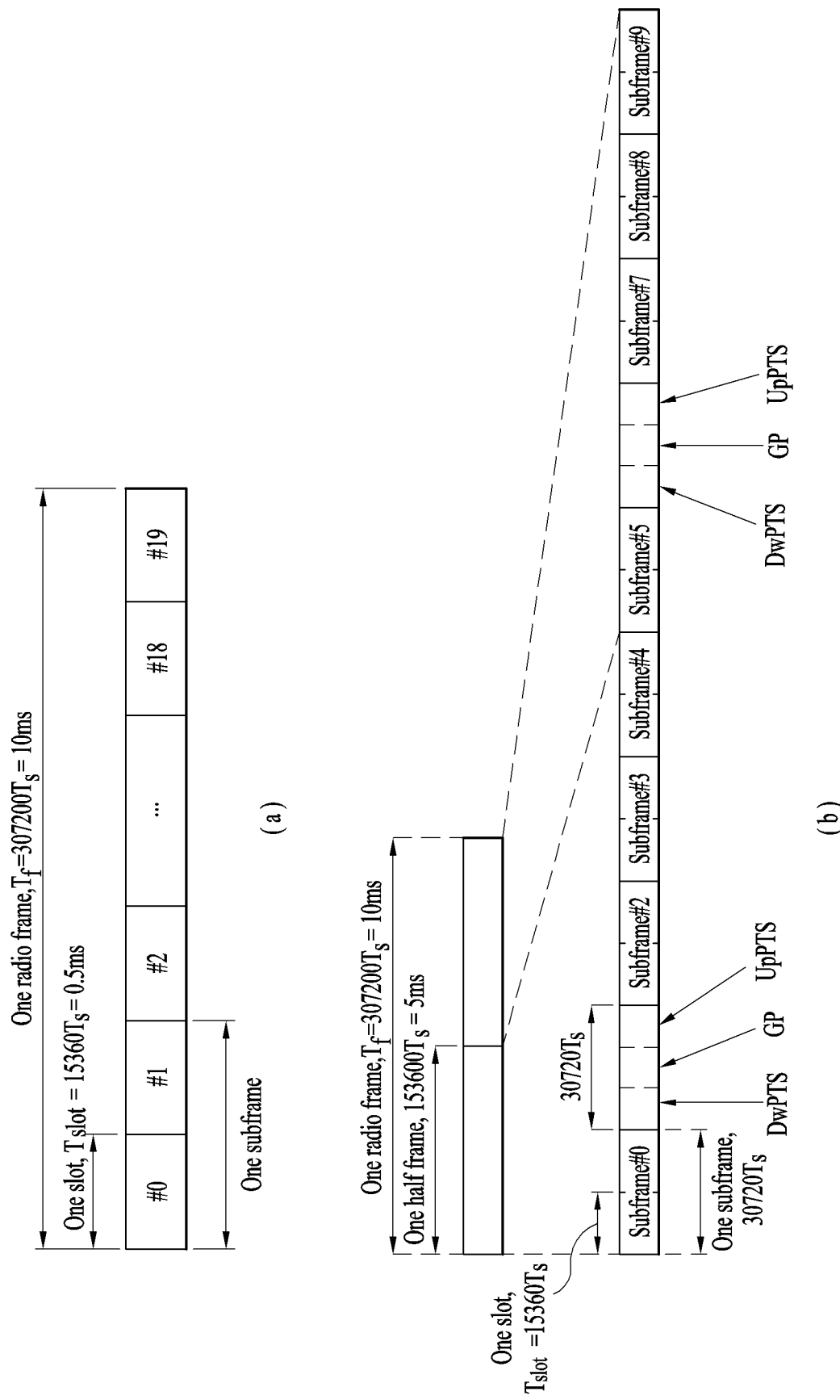
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | UpPTS Extended cyclic prefix in uplink | DwPTS | UpPTS Normal cyclic prefix in uplink | UpPTS Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 3:
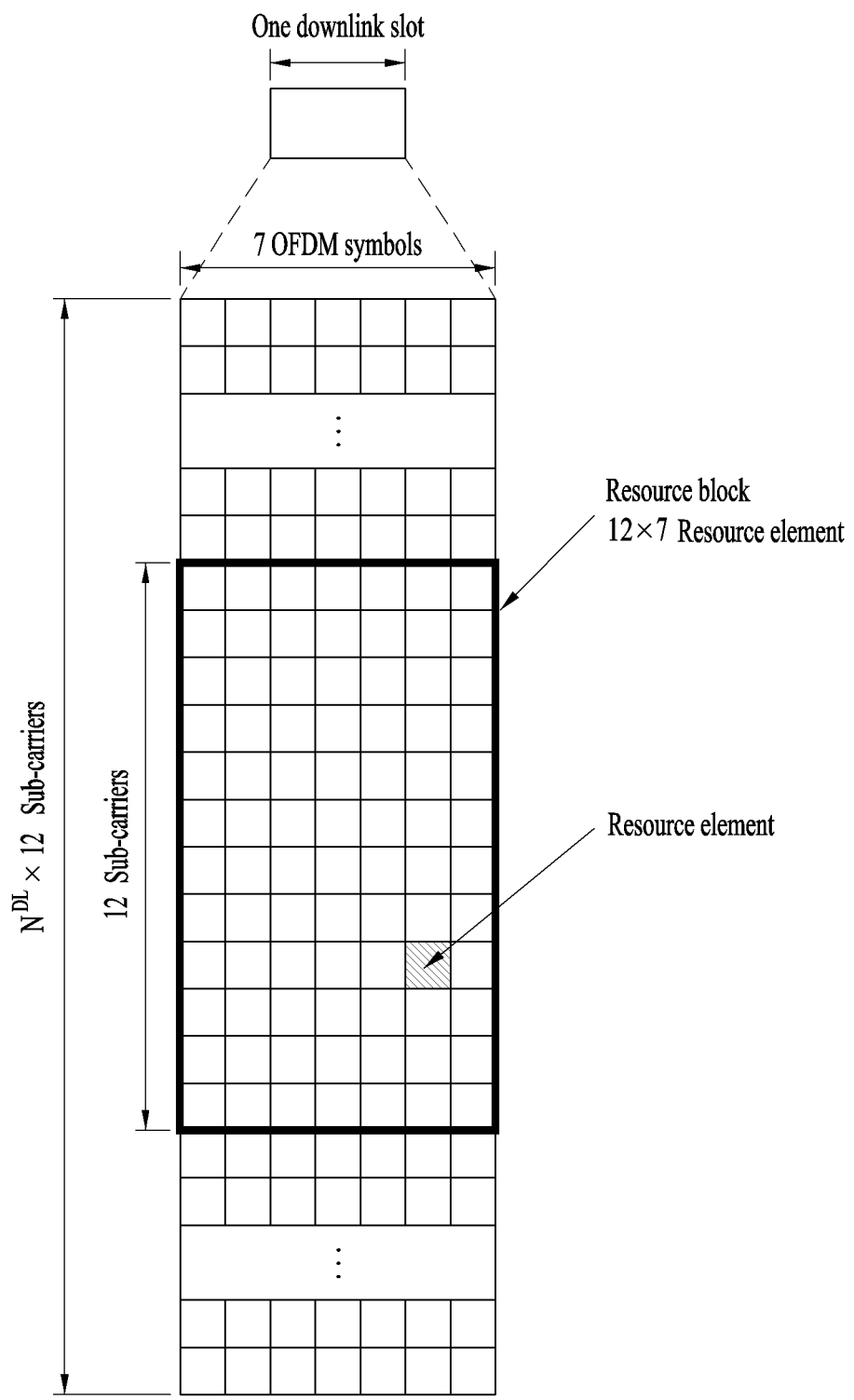
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
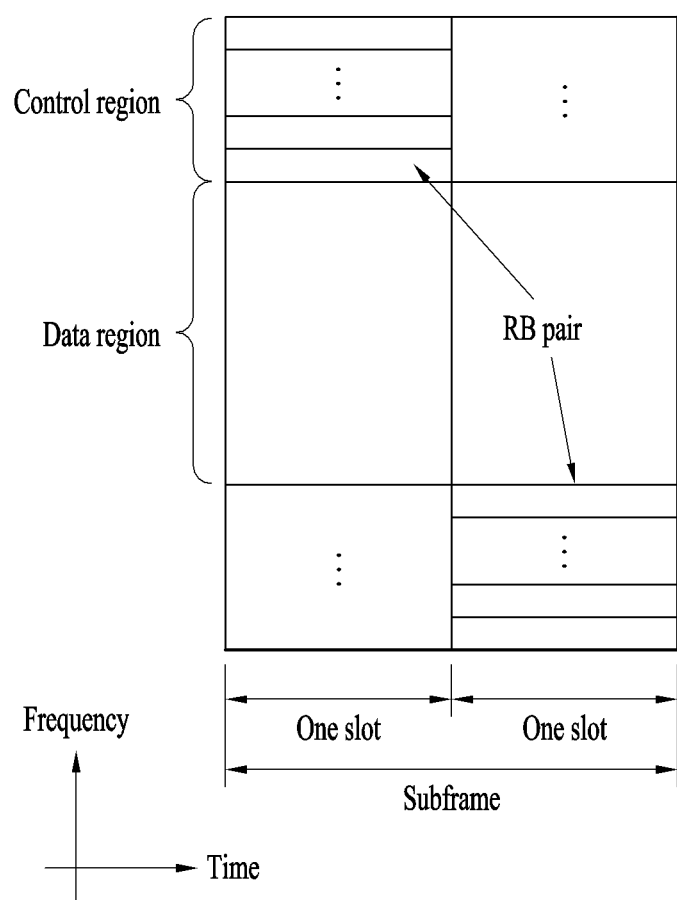
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
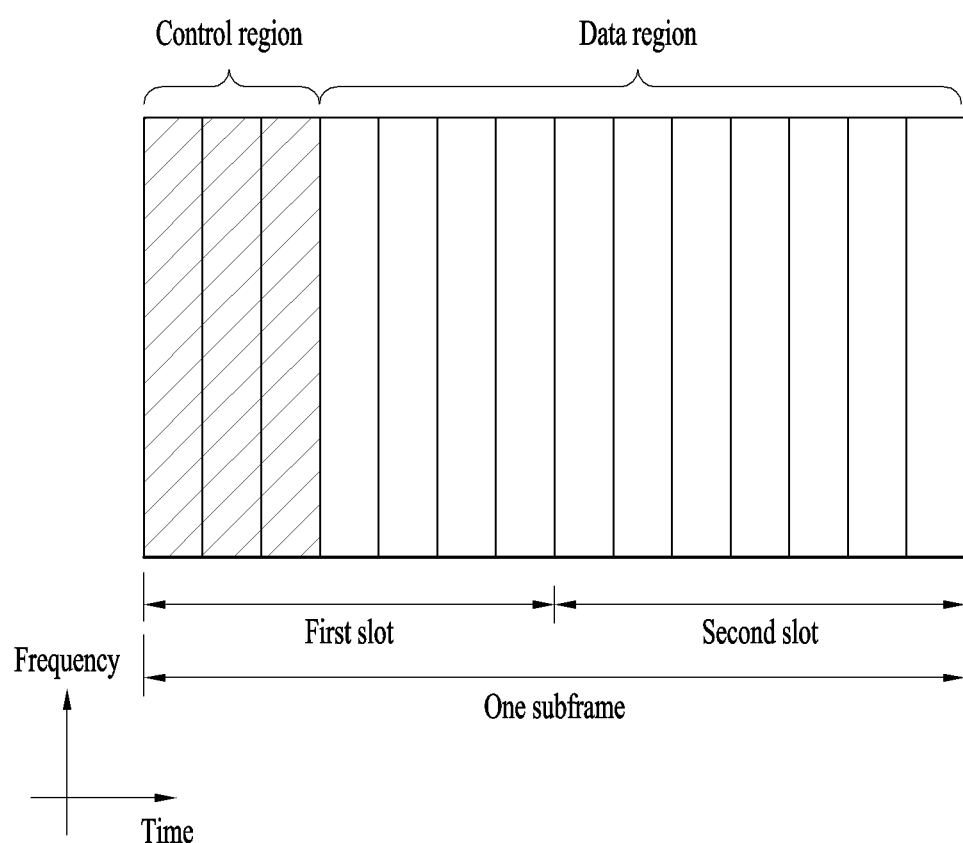
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

2. SRS (Sounding Reference Signal)

In a 3GPP LTE system, a UE transmits an SRS to a base station for the purpose of measuring an uplink channel environment. The SRS may be used for channel measurement of a portion of total uplink channel bandwidth, and the base station may perform a frequency selective scheduling and link adaptation process based on the measured uplink channel information. In addition, the channel information measured from the SRS may be used for downlink transmission using reciprocity between a downlink (DL) channel and an uplink (UL) channel in a TDD based system. The SRS may be used to measure an angle of arrival (AOA) in downlink beamforming or location based services.

The base station informs the UE of cell common SRS information through system information block 2 (SIB2) and sends UE-specific SRS information through RRC signaling. The SRS information transmitted through SIB2 and the SRS information transmitted through RRC signaling are shown in Tables 2 and 3 below.

TABLE 2

| Information Elements | |
|---|---|
| Uplink Sounding Reference Signal Configuration Common | Setup SRS Bandwidth Configuration |
| | SRS Subframe Configuration |
| | A/N + SRS Simultaneous TX |
| | SRS Max UpPTS (TDD) |

TABLE 3

| Information Elements | | |
|---|---|---|
| Uplink Sounding Reference Signal Configuration Dedicated | Setup | SRS Bandwidth<br>SRS Hopping Bandwidth<br>Frequency Domain Position<br>Duration<br>SRS Configuration index<br>Transmission Comb<br>Cyclic Shift |

The "SRS bandwidth configuration" of Table 2 indicates one of values of 0 to 7 and the "SRS bandwidth" of Table 3 indicates one of values of 0 to 3. For example, when the channel bandwidth of the system is 1.4 MHz, 3 MHz or 5 MHz, the above two parameters may indicate the row and column of the lookup table of Table 4 below.

TABLE 4

| SRS Bandwidth Configuration | SRS Bandwidth = 0 | | SRS Bandwidth = 1 | | SRS Bandwidth = 2 | | SRS Bandwidth = 3 | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 34 | 1 | 4 | 6 | 4 | 1 | 4 | 1 |
| 3 | 30 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

In the look-up table of Table 4 above, $m_{SRS}$ denotes the number of resource blocks (RBs) in which the SRS is transmitted, and $N_X$ (where, X=0, 1, 2, 3) means one of parameters for setting a frequency position where the SRS is transmitted. Specifically, $N_X$ may be used to calculate a frequency axis start position (e.g., a lowest subcarrier) of the SRS along with $m_{SRS}$ and a "frequency domain position" which may have one of values of 0 to 23.

A smallest transmission band in which the SRS may be transmitted on the frequency axis is 4 RBs. In general, the smaller the SRS transmission band, the smaller channel information which may be acquired by the base station. However, since a UE located in a cell boundary region has insufficient transmit power to perform wideband transmission, it may be more advantageous for the UE to perform transmission with collected transmit power in a small SRS transmission band. In the case of narrow band SRS transmission, frequency hopping is applied to the SRS in order to measure an entire channel band. Whether frequency hopping is applied may be determined through the "SRS hopping bandwidth" parameter of Table 3. The parameter indicates one of values of 0, 1, 2 and 3 and, when the "SRS hopping bandwidth" is less than the "SRS bandwidth", frequency hopping is enabled and, otherwise, frequency hopping is disabled.

Meanwhile, in the case of wideband SRS transmission, the number of SRSs which may be simultaneously transmitted by a plurality of UEs may be limited. In the LTE system, in order to solve the above problems, the SRS was designed to be transmitted using an interleaved frequency division multiple access (IFDMA) method. A "transmission comb" parameter indicates a value of 0 or 1 and each UE may be configured to transmit the SRS in an odd or even subcarrier index. In other words, in one SF-FDMA symbol, a resource region in which the SRS is transmitted may be divided into two transmission combs having an "odd" or "even" value.

Additional multiplexing capacity can be achieved through a cyclic shift (CS). The base station may inform the UE of a CS applied to the SRS among eight different CSs through a "cyclic shift" parameter.

In Table 2, a cell-specific "SRS subframe configuration" transmitted through SIB2 may be allocated one of values of 0 to 15. Here, each value indicates the position of a subframe in which the SRS may be enabled in units of a radio frame composed of 10 subframes. For example, FDD may be expressed as shown in Table 5 below.

TABLE 5

| SRS Subframe Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | ✓ | ✓ | ✓ | ✓ | ✓ | ✓ | ✓ | ✓ | ✓ | ✓ |
| 1 | ✓ | | ✓ | | ✓ | | ✓ | | ✓ | |
| 2 | | ✓ | | ✓ | | ✓ | | ✓ | | ✓ |
| 3 | ✓ | | | | ✓ | | | | | |
| 4 | | ✓ | | | | ✓ | | | | |
| 5 | | | ✓ | | | | ✓ | | | |
| 6 | | | | ✓ | | | | ✓ | | |
| 7 | ✓ | ✓ | | | | ✓ | ✓ | | | |
| 8 | | | ✓ | ✓ | | | | ✓ | ✓ | |
| 9 | ✓ | | | | | | | | | |
| 10 | | ✓ | | | | | | | | |
| 11 | | | ✓ | | | | | | | |
| 12 | | | | ✓ | | | | | | |
| 13 | ✓ | ✓ | ✓ | ✓ | ✓ | | ✓ | | ✓ | |
| 14 | ✓ | ✓ | ✓ | ✓ | ✓ | ✓ | ✓ | | ✓ | |

In Table 5, "SRS Subframe Configuration" 15 is currently in a reserved state and thus is not shown in Table 5. A subframe set in which the UE actually transmits the SRS is determined by combining the "SRS subframe configuration" and the "SRS configuration index". The "SRS configuration index" determines an SRS periodicity and an SRS subframe offset. In the case of an FDD system (or in the case of a TDD system and SRS periodicity>2 ms), the SRS transmission subframe of a specific UE is a cell-specific SRS subframe and may be defined as a subframe satisfying the following condition.

$$(10n_f + k_{SRS} + T_{offset}) \bmod T_{SRS} = 0 \quad \text{[Equation 1]}$$

Where, $n_f$ is the System Frame Number (0 to 1023), $k_{SRS}$ for FDD is the subframe index within the radio frame (0 to 9), TSRS is the SRS periodicity, and $T_{offset}$ is the SRS subframe offset.

Next, the "Duration" Parameter may indicate one of periodic SRS transmission and single SRS transmission. In the Rel-10 LTE system, two types of triggering type 0 and 1 are defined, triggering type 0 means a type for triggering periodic SRS or single SRS through RRC signaling and triggering type 1 means a type for triggering aperiodic SRS transmission through DCI. SRS configuration information may be independently set according to triggering type.

Meanwhile, an SRS transmission Subframe for the triggering type 1 SRS is a (cell-specific) SRS Subframe, is an (n+k)-th (k≥4) SF based on an n-th SF in which an SRS request is received, and may be defined as a subframe satisfying the conditions shown in Equation 2 below.

$$(10n_f + k_{SRS} + T_{offset,1}) \bmod T_{SRS,1} = 0 \quad \text{[Equation 2]}$$

where, $n_f$ is the System Frame Number (0 to 1023), $k_{SRS}$ for FDD is the subframe index within the radio frame (0 to 9), $T_{SRS,1}$ is the SRS periodicity for triggering type 1, and $T_{offset,1}$ is the SRS subframe offset for triggering type 1.

3. Proposed Embodiment

In a newly proposed system, a method of variously setting a transmission time interval (TTI) with respect to all or specific physical channels may be considered in order to satisfy requirements of various application fields. For example, in a 3GPP LTE system, the TTI which is a unit applied to physical channel transmission such as PDSCH/PUSCH/PUCCH may be set to be less than 1 msec in order to reduce latency in communication between an eNB and a UE according to a scenario. In addition, when there is a plurality of physical channels within a single subframe (for example, 1 msec) for a single UE or a plurality of UEs, the TTIs applied to the respective channels may be different.

Hereinafter, in the present invention, for convenience of description, the technical configuration of the present invention will be described based on an LTE system. At this time, the TTI which is a signal transmission unit means a reception time interval of a transport block set and means a period in which a transport block set may be transmitted in a physical layer through a radio interface. In general, in the LTE system, the TTI may be 1 msec (hereinafter, referred to as a normal TTI), which is the subframe size of the LTE system, or a TTI having a shorter time length than the normal TTI (hereinafter, referred to as a short TTI or an sTTI). Such a TTI may be a single/multiple OFDM or SC-FDMA symbol unit.

Based on the above description, in the present invention, a UL data transmission method and an SRS transmission method considering SRS transmission in the sTTI is proposed. Hereinafter, for convenience of description, a UL data channel transmitted in the sTTI is referred to as an sPUSCH.

3.1. Puncturing/Rate Matching of sPUSCH Considering SRS TX

3.1.1. First Method

A base station may inform a UE of whether puncturing or rate matching of an sPUSCH transmitted through an SRS transmission symbol within a specific sTTI is performed using one of the following methods.

(1) The base station may configure symbols, in which the SRS may be transmitted, in advance through a higher layer signal. In this case, if the specific sTTI includes the SRS symbols, the UE may perform puncturing or rate matching for the SRS symbols.

(2) The base station may indicate whether puncturing or rate matching for the SRS symbols is performed using a dynamic control signal (e.g., DCI).

(3) The base station may instruct the UE to use one of the above-described two methods using a higher layer signal.

Here, the symbol, in which the SRS is transmitted, is referred to as an SRS transmission symbol or an SRS symbol.

More specifically, the UE according to the present invention may perform puncturing or rate matching with respect to a region in which the SRS may be transmitted, rather than all SRS transmission symbols, or transmit data in a region in which consecutive PRB sets do not collide with SRS resources (that is, may perform partial puncturing or rate matching).

In the LTE system according to the embodiment of the present invention, the base station may inform the UE of subframes in which puncturing for the SRS transmission symbol will be performed through an "SRS Subframe Configuration" transmitted through SIB. At this time, if an sTTI shorter than a subframe length of the conventional LTE system is introduced, an sTTI in which the SRS is transmitted and an sTTI in which the SRS is not transmitted may be distinguished even in a single subframe. At this time, in the sTTI in which the SRS may be transmitted, even if the UE does not transmit the SRS when transmitting a PUSCH, puncturing or rate matching for the SRS transmission symbol may be performed in order to prevent interference with SRS transmission of another UE.

Accordingly, in the present invention, the "SRS Subframe Configuration" may be extended to indicate a position where the SRS may be transmitted in sTTI units. Specifically, when the base station informs the UE of the SRS transmission position within the sTTI through a higher layer signal, the following methods may be considered.

1) SRS sTTI Configuration
An sTTI set including N sTTIs (within a radio frame unit) may be defined and the base station may inform the UE of corresponding information through a higher layer signal (e.g., an sTTI length, an SRS symbol position in the sTTI, an SRS frequency position, etc.)
The base station may inform the UE of sTTIs in which the SRS may be transmitted within the sTTI set through a higher layer signal (such as RRC).

2) SRS Symbol Configuration
A symbol set including N symbols (within a radio frame unit) is defined. Such definition may be set offline and may be preferably set by the base station.
The base station may inform the UE of symbols in which the SRS may be transmitted in the symbol set through a higher layer signal (such as RRC).

As described above, as a method of, at a base station, informing the UE of an SRS transmission position, a method of, at a base station, informing a UE of information on an sTTI or symbol in which an SRS is transmitted within a specific time unit may be applied. However, if the base station informs the UE of a position where the SRS may be transmitted through a higher layer signal such as RRC, the UE should assume SRS transmission of another UE and perform puncturing or rate matching for the SRS symbol even when the SRS is not actually transmitted within the sTTI. In this case, the shorter the length of the sTTI, the greater performance the deterioration of puncturing or rate matching.

In the present invention, as another method, the base station may inform the UE of information on the sTTI in which the SRS may be transmitted through a dynamic control signal such as DCI. For example, the base station may inform the UE of whether puncturing or rate matching for the SRS symbol within the sTTI in which the sPUSCH is transmitted is performed through a UL grant for an sPUSCH.

If the above-described technical configuration is generalized, the base station may inform the UE of whether an SRS symbol is transmitted within an sTTI and whether puncturing or rate matching for an SRS symbol is performed through the following methods.

1> through the UL grant
2> through common DCI or group DCI. In this case, the base station may inform the UE of whether the SRS symbol is transmitted even for PUSCH transmission. In the case of a specific PUCCH format (e.g., PUCCH format 2), when the base station instructs transmission of the SRS symbol, the UE may transmit a PUCCH through a shortened PUCCH format.

3.1.2. Second Method

When a transport block size (TBS) is determined by the number of PRBs (e.g., $N_{PRB}$) and an MCS index (e.g., $I_{MCS}$), a base station sets a TBS based on a normal TTI (e.g., $N_{PRB, Normal}$, $I_{MCS, Normal}$). At this time, a UE may scale $N_{PRB, Short}$ for a TBS to be applied to an sTTI in consideration of the SRS symbol as shown in Equation 3 and then apply the TBS corresponding to $N_{PRB, Short}$ and $I_{MCS}$.

$$N_{PRB, Short} = \max\left\{\left\lfloor N_{PRB, Normal} \times \frac{N_{Sym, Short} - N_{SRS}}{N_{Sym, Normal}} \right\rfloor, 1\right\} \quad \text{[Equation 3]}$$

where, $\lfloor \rfloor$ means a lowering operator and the above function outputs an integer less than or greater than an input value. $N_{Sym, Normal}$ means the number of symbols in the normal TTI and $N_{Sym, Short}$ and $N_{SRS}$ mean the number of symbols of the sPUSCH in the sTTI and the number of SRS symbols, respectively.

At this time, if there is a TBS table corresponding to $N_{PRB, Short}$ and $I_{MCS}$, $N_{Sym, Short}$ may be applied instead of $N_{Sym, Normal}$ in Equation 3.

According to the second method of the present invention, if the UE determines the TBS for the sTTI by scaling the TBS in the normal TTI, the UE may scale the number of PRBs by a ratio of the sTTI length to the normal TTI length, similarly to TBS scaling in DwPTS of the release-13 LTE system. For example, when the number of symbols of the normal TTI is $N_1$ and the number of symbols of the sTTI is $N_2$, the UE may define $N_{PRB, Short}$ for determining the TBS in the sTTI by a value obtained by scaling the number of PRBs $N_{PRB, Normal}$ in the normal TTI as shown in Equation 4.

$$N_{PRB, Short} = \max\left\{\left\lfloor N_{PRB, Normal} \times \frac{N_2}{N_1} \right\rfloor, 1\right\} \quad \text{[Equation 4]}$$

However, if the length of the sTTI is short, a TBS difference depending on whether rate matching for the SRS symbol is performed may be large. Therefore, in the present invention, a method of applying an sTTI length excluding the number of SRS symbols when the UE scales the TBS is proposed.

As a modified example, when an sTTI length is in a specific range, the UE may equally apply $N_{PRB, Short}$ as a value obtained by scaling $N_{PRB, Normal}$ by a certain ratio. For example, if M sets (e.g., $S_1, S_2, \ldots, S_M$), to which the sTTI length may belong, are defined, when a specific sTTI length (e.g., 1 (the lower case of L)) belongs to an m-th set (e.g., Sm), the UE may apply a scaling ratio $R_m$ to calculate $N_{PRB}$, Short as shown in Equation 5.

$$N_{PRB, Short} = \{\lfloor N_{PRB, short} \times R_m \rfloor, 1\} \text{ if } l \in S_m \quad \text{[Equation 5]}$$

More specifically, the UE may apply 0.375 as $R_m$ when the sTTI length applied in a UL subframe is 6 or less and apply 0.75 as $R_m$ when the sTTI length applied in a UL subframe is 7 or greater.

3.1.3. Third Method

When a UE performs puncturing or rate matching for an sPUSCH in consideration of SRS transmission within a specific $sTTI_1$, a base station or the UE may define a new $sTTI_2$ excluding an SRS symbol in the $sTTI_1$ and apply an sPUSCH transmission structure corresponding to the $sTTI_2$.

Figure 6:
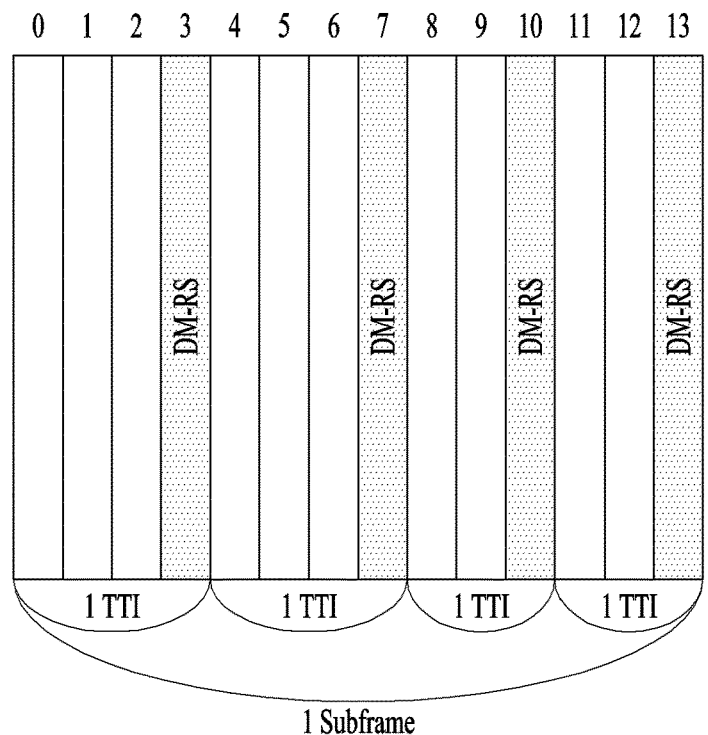
FIG. 6 is a diagram showing one UL subframe, to which a short TTI is applied, according to the present invention.

FIG. 6 is a diagram showing one UL subframe, to which a short TTI is applied, according to the present invention. As shown in FIG. 6, two sTTIs having a length of four symbols and two sTTIs having a length of three symbols are included in a single UL subframe.

At this time, when the SRS of a legacy UE (e.g., an LTE UE according to release-13 or below) is transmitted in the last symbol of a UL subframe, the DM-RS of the last sTTI in the UL subframe and the SRS transmission may collide with each other. As a method of solving the above problem, a new sTTI excluding the SRS symbol in the existing sTTI may be applied to the sTTI indicated as an sTTI, in which the SRS may be transmitted, according to the first method. Therefore, the sTTI excluding the SRS symbol may have the number of DM-RS symbols and symbol positions different from those of the existing sTTI.

Figure 7:
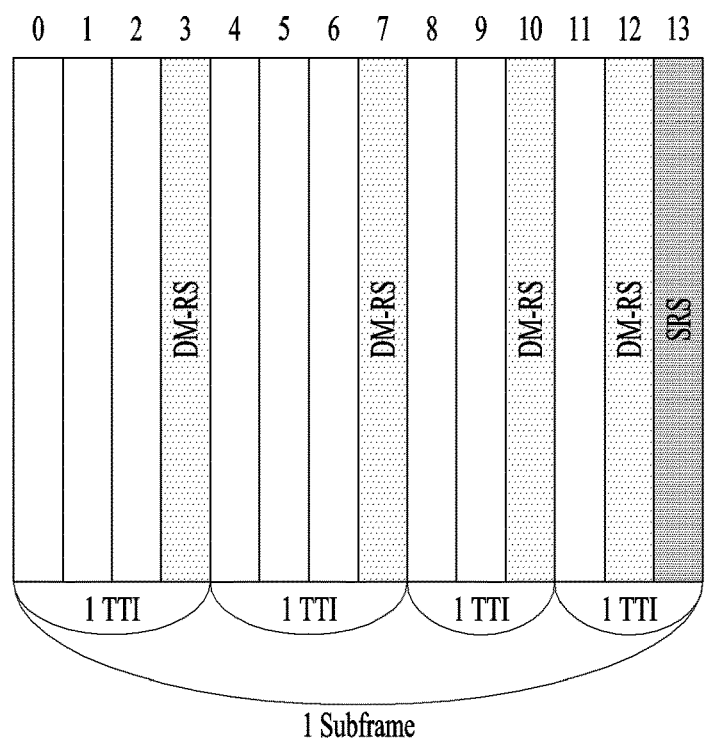
FIG. 7 is a diagram illustrating a UL subframe, to which a third method of the present invention is applied.

FIG. 7 is a diagram illustrating a UL subframe, to which a third method of the present invention is applied. As shown in FIG. 7, when the SRS may be transmitted in the last sTTI, the DM-RS position may be changed from symbol #13 to symbol #12.

3.2. Modification of sTTI Considering SRS TX

3.2.1. Fourth Method

If an SRS transmission symbol is included in a specific sTTI, when the number of symbols excluding the SRS transmission symbol within the sTTI is equal to or less than N ($\geq 0$), the UE may perform one or more of the following operations.

(1) HARQ-ACK transmission for the corresponding sTTI is deferred to an sTTI at a specific time after the sTTI.

(2) The remaining symbols of the corresponding sTTI are used for the purpose of SRS transmission.

(3) A PUSCH or PUCCH scheduled to the corresponding sTTI is dropped.

When there is a symbol in which the SRS may be transmitted in a specific sTTI, if a new sTTI excluding the SRS symbol in the existing sTTI is configured like the third method, the length of the sTTI may be very short like the last sTTI of FIG. 7. When the length of the sTTI is too short, the TBS applicable to the corresponding sTTI is limited, which may be inefficient.

Accordingly, in the present invention, if the number of symbols excluding the SRS transmission symbol within a specific sTTI is less than a predetermined value, the other symbols within the sTTI may be used for the purpose of SRS transmission instead of data transmission. At this time, if resources for HARQ-ACK transmission are insufficient, the corresponding sTTI may be excluded from HARQ-ACK timing. For example, when the UE transmits HARQ-ACK for an n-th PDSCH at a time point after four sTTIs, if an sTTI in which the HARQ-ACK is transmitted is an sTTI in which the SRS may be transmitted, the UE may transmit the HARQ-ACK in a next sTTI (or an sTTI at a specific time point).

3.2.2. Fifth Method

If an SRS transmission symbol is included in a specific sTTI, a base station or a UE may include the remaining symbols excluding the SRS transmission symbol in the corresponding sTTI in an adjacent sTTI.

As described in the fourth method, when there is a symbol, in which an SRS may be transmitted, in a specific sTTI, if a new sTTI excluding the SRS symbol in the existing sTTI is configured like the third method, the length of the sTTI may be very short like the last sTTI of FIG. 7 and transmission efficiency may be reduced.

Therefore, in the present invention, as another method of solving the problem, a method of including the remaining symbols excluding the SRS transmission symbol in the sTTI in an adjacent sTTI is proposed.

Figure 8:
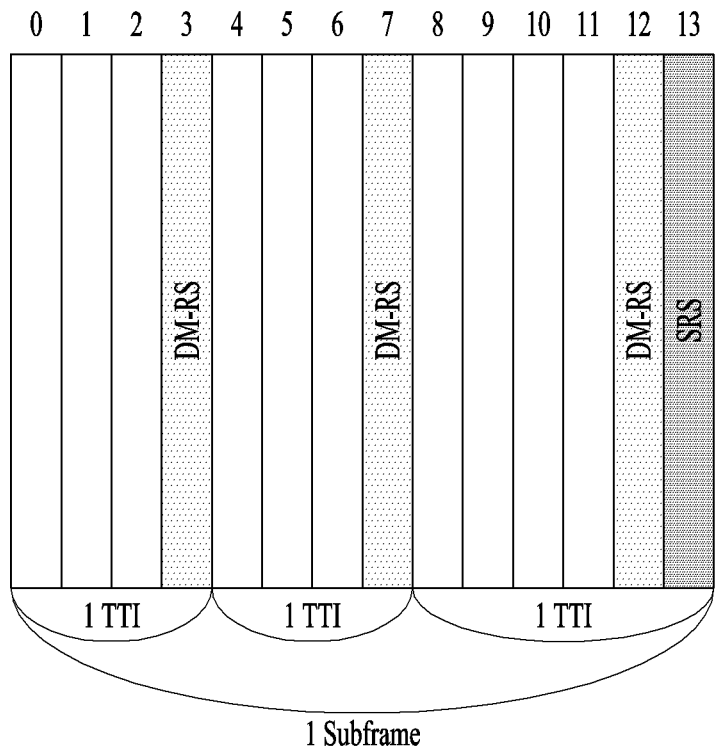
FIG. 8 is a diagram illustrating a UL subframe, to which a fifth method of the present invention is applied.

FIG. 8 is a diagram illustrating a UL subframe, to which a fifth method of the present invention is applied. As shown in FIG. 8, third and fourth sTTIs may be merged to configure a new TTI having a length of six symbols.

3.3. (SRS TX with Reduced Latency)

3.3.1. Sixth Method

A base station or a UE may set a period or a time axis offset for determining a point in time when an SRS may be transmitted in one of the following units. However, the unit for setting the period and the unit for the time axis offset may be different from each other.

(1) normal TTI units (including 1 ms)
(2) slot units
(3) sTTI units (the SRS symbol position of each sTTI is predefined)
(4) symbol units In the LTE system, a point in time when the UE transmits a periodic SRS is determined by a subframe applied to both the "SRS Subframe Configuration" and the "SRS Subframe Index". In order to support the periodic SRS for the sTTI, "SRS Subframe Index" needs to extend in sTTI or symbol units as "SRS Subframe Configuration" extends in sTTI units or symbol units in the first method of the present invention.

Therefore, the "SRS Subframe Index" according to the present invention may indicate the transmission period of the SRS and the time axis offset for SRS transmission, which may be applied in normal TTI, slot, sTTI or symbol units. At this time, the SRS period and the time axis offset may be set in different units.

For example, the SRS period may be set in normal TTI units and the time axis offset for the SRS transmission time point may be set in sTTI or symbol units. As another example, both the SRS period and the time axis offset for the SRS transmission time point may be set in slot units.

In the sixth method, even when the RSR period is not reduced, it is possible to diversify the time axis offset for the SRS transmission time to allow the UE to transmit more SRS resources.

3.3.2. Seventh Method

A base station or a UE may change SRS configuration information (e.g., SRS Bandwidth, SRS Hopping Bandwidth, Frequency Domain Position, Transmission Comb, Base sequence, Cyclic shift, etc.) applied to an SRS according to a position where the SRS is transmitted.

(1) When the SRS is transmitted in (legacy) SRS resources, the transmitted SRS follows SRS configuration information which may coexist with (legacy) SRSs. Therefore, there may be two pieces of independent SRS configuration information for the SRS.

(2) When the SRS is transmitted in (legacy) PUSCH DM-RS resources, the transmitted SRS may be transmitted in different cyclic shifts (CSs) in the same frequency axis resource region as the (legacy) PUSCH DM-RS resources.

In general, an sTTI based UE is different from a normal TTI based UE in terms of the transmission structure, independent SRS configuration information (e.g., SRS Bandwidth, SRS Hopping Bandwidth, Frequency Domain Position, Transmission Comb, Base sequence, Cyclic shift, etc.) is applicable. However, in the LTE system, if the normal TTI (e.g., 1 ms or 1 subframe) based legacy UE and the sTTI based UE coexist, the SRS transmitted by the normal TTI based UE and the SRS transmitted by the sTTI based UE may collide with each other at the legacy SRS symbol position of a specific UL subframe.

Therefore, in the present invention, the following methods are proposed in order to solve the problem.

Figure 9:
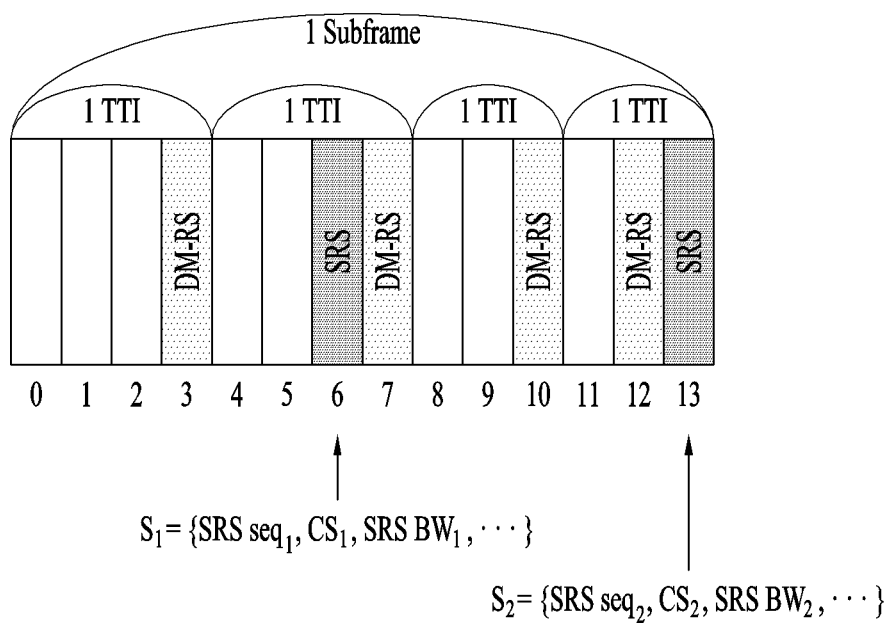
FIG. 9 is a diagram showing an example according to a seventh method of the present invention.

FIG. 9 is a diagram showing an example according to a seventh method of the present invention.

As shown in FIG. 9, in the present invention, an sTTI based UE may have SRS configuration information $S_1$ applied to an SRS symbol instead of a legacy SRS symbol (that is, a symbol in which the normal TTI based UE transmits the SRS) and SRS configuration information $S_2$ applied to the legacy SRS symbol. At this time, the sTTI based UE may apply $S_2$ to the legacy SRS symbol and apply $S_1$ to the SRS symbol transmitted by only the sTTI based UE.

3.3.3. Eighth Method

The UE may multiplex the SRS with the other resources in the sTTI using one or more of the following methods.

(1) The base station may indicate one of the following through a higher layer signal (or dynamic control signal (e.g., DCI)) in the form of data transmission in the SRS symbol of the sTTI.

no data transmission in the SRS symbol
all frequency resources allocated in the UL grant of the SRS symbol
resources corresponding to a specific comb among all frequency resources allocated in the UL grant of the SRS symbol. At this time, the remaining combs may be reserved for the SRS.

(2) The base station may indicate one of the following through a higher layer signal (or dynamic control signal (e.g., DCI)) in the form of DM-RS transmission in the SRS symbol of the sTTI.

no DM-RS transmission in the SRS symbol
all frequency resources allocated in the UL grant of the SRS symbol
resources corresponding to a specific comb among all frequency resources allocated in the UL grant of the SRS symbol
multiplexing the SRS with the CS in the SRS symbol (or a specific SRS resource is used as a DM-RS)

When the UE transmits the SRS in the sTTI, if the symbol for only SRS transmission is configured, overhead according to SRS transmission may be relatively large, as compared to the sTTI length. Therefore, in the present invention, a method of transmitting different signals in the SRS symbol resources may be considered in order to reduce SRS transmission overhead.

For example, if the SRS is not actually transmitted in the symbol in which the SRS may be transmitted, the base station may instruct the UE to transmit data or a DM-RS in the SRS symbol through a dynamic control signal. If a specific transmission comb resource is not used for SRS transmission in the SRS symbol, the base station may instruct the UE to use the transmission comb for data or DM-RS transmission. Therefore, the UE may multiplex the SRS with the data or the DM-RS using the corresponding transmission comb resource. At this time, if the DM-RS and the SRS are multiplexed in one symbol, there may be a transmission power (TXP) setting problem for each RS. Therefore, the following methods may be considered with respect to the TXP.

1) The DM-RS may follow the TXP of the SRS or the SRS may follow the TXP of the DM-RS.

2) The DM-RS TXP may be defined relative to the SRS TXP (e.g., TXP offset or TXP ratio setting).

Hereinafter, for convenience of description, the SRS, the transmission time point of which is determined based on the sTTI, is referred to as an sSRS and the SRS, the transmission time point of which is determined based on the normal TTI, is referred to as a legacy SRS. Hereinafter, in the present invention, for example, the sSRS will be described. However, this configuration is applicable to the legacy SRS.

3.3.4. Ninth Method

The frequency axis resources for sSRS transmission may be configured according to at least one of the following methods.

(1) System bandwidth (or maximum SRS bandwidth) in which the sSRS may be transmitted is independently configured and SRS bandwidth defined in the bandwidth is set to SRS bandwidth for sSRS transmission.

(2) SRS bandwidth for sSRS transmission is limited to allocated bandwidth for sTTI operation. For example, the UE may assume that only sSRS transmission in which SRS bandwidth less than bandwidth for sTTI operation is configured is valid.

(3) Frequency resources for sSRS transmission are limited not to include a specific frequency resource. For example, the UE may assume that only sSRS transmitted not to include a specific frequency resource (e.g., a frequency resource in a legacy PUCCH region) is valid.

(4) sSRS bandwidth configured for sSRS transmission may be configured not to include invalid frequency resources according to separate configuration for a specific frequency resource which may not be used for uplink or sSRS transmission. In this case, the base station may inform the UE of whether sSRS transmission may be performed in the invalid frequency/time resources configured for uplink through higher layer signaling (e.g., SIB or UE-specific signaling). In particular, the sSRS may be set in downlink spectrum or downlink portion. In this case, the corresponding resource may not be used for uplink, but the UE may transmit the SRS using the corresponding resource.

(5) The base station may configure SRS bandwidth independent of the legacy SRS as SRS bandwidth for sSRS transmission through higher layer signaling (e.g., RRC signaling). At this time, sSRS bandwidth and configuration may be independently or commonly configured for each sTTI length.

(6) The base station may instruct the UE to select one of a plurality of SRS bandwidths for sSRS transmission through sSRS triggering DCI. Alternatively, the base station may inform the UE of sSRS transmission bandwidth or an sSRS transmission PRB set through DCI.

(7) The base station may set whether frequency hopping upon sSRS transmission is enabled/disabled through sSRS triggering DCI.

According to the embodiment of the present invention, in a wireless communication system supporting both an sTTI and a normal TTI, a legacy UE supporting only the normal TTI does not perceive sTTI based transmission, but a UE according to the present invention, which supports both the normal TTI and the sTTI, perceives normal TTI based transmission. Therefore, it may be desirable to minimize effects on normal TTI based legacy PUCCH or legacy PUSCH transmission during sTTI based sSRS transmission.

At this time, during sSRS transmission, sSRS transmission frequency resources may be configured not to include a legacy PUCCH region which is a channel for transmitting at least important information such as HARQ-ACK. As one method of supporting the above operation, the base station or the UE may configure system bandwidth $BW_1$ for sSRS transmission to be less than system bandwidth $BW_0$ for normal TTI operation and set SRS bandwidth defined in $BW_1$ as an actual frequency resource for sSRS transmission. Alternatively, the base station or the UE may limit the sSRS transmission band to bandwidth allocated for sTTI operation.

For example, the UE may determine that transmission of sSRSs having SRS bandwidth greater than bandwidth allocated for the sTTI operation is invalid and omit transmission.

As another example, the SRS bandwidth for sSRS transmission may be configured to have SRS bandwidth independent of the legacy SRS. In particular, in the case of the aperidoccally transmitted sSRS, a plurality of SRS bandwidths is pre-set for sSRS transmission and one of the plurality of SRS bandwidths may be indicated through triggering DCI. The base station may set whether frequency hopping is enabled/disabled through sSRS triggering DCI such that frequency resources used for sSRS transmission do not include a specific frequency resource such as a legacy PUCCH region.

3.3.5. Tenth Method

When frequency-axis resources for sSRS transmission are configured, the base station or the UE may define sSRS transmission frequency resources with discontinuous frequency resources (or PRBs) and apply at least one of the following methods as the frequency hopping method of the sSRS in the sSRS transmission region.

(1) The base station or the UE may set sSRS system bandwidth based on a lowest PRB index and a highest PRB index among configured PRBs and apply puncturing operation to the sSRS sequence of the corresponding region when the sSRS is transmitted in the PRBs which are not included in the sSRS transmission frequency resources within the sSRS bandwidth.

(2) The base station or the UE may apply virtual (sequential) indices to the configured PRBs, set the sSRS system bandwidth to N PRBs with respect to all N PRBs allocated as the sSRS transmission frequency resources, and apply frequency hopping of the sSRS according to the virtual indices within the sSRS system bandwidth.

(3) When the frequency-axis resources for sSRS transmission are composed of discontinuous frequency resources (or PRBs), the base station or the UE may divide sSRS system bandwidth composed of continuous frequency resources in units of M PRBs (e.g., M=4), determine whether sSRS transmission is possible in units of M PRBs, and configure sSRS transmission frequency resources in units of M PRBs in which sSRS transmission is possible. At this time, M may be a pre-agreed value or a value set to the sSRS sequence length. Thereafter, the UE may perform sSRS frequency hopping according to the virtual index as in (2) of the tenth method or follow a physical index and perform only sSRS frequency hopping supported on the sSRS transmission frequency resources (that is, an sSRS frequency hopping pattern using the M PRB units excluded from the sSRS system bandwidth is not supported).

In a wireless communication system supporting an sTTI and a legacy TTI according to the embodiment of the present invention, there may be a service for performing narrowband operation such as evolved machine type communication (eMTC) within a band in which an sSRS is transmitted. In this case, the UE may transmit the sSRS by avoiding the narrowband.

As one method, if the sSRS is transmitted in a state including the narrowband such as eMTC, the UE may transmit the sSRS by puncturing a portion of the sSRS sequence included in the narrowband. Alternatively, if the narrowband is not excessively large, the UE may assign virtual indices to the remaining resources excluding the narrowband and then perform frequency hopping operation of the sSRS based on the virtual indices. In this case, if the narrowband has sufficiently small bandwidth, the sequence characteristics of the sSRS are expected to be somehow guaranteed. Further, when the narrowband is excluded from the sSRS transmission band, a region in which a multiple of 4 RBs as the sSRS minimum transmission unit while including the narrowband may be excluded from the sSRS transmission resources or a region which is a multiple of an actual sSRS transmission length while including the narrow band may be excluded from the sSRS transmission resources.

Figure 10:
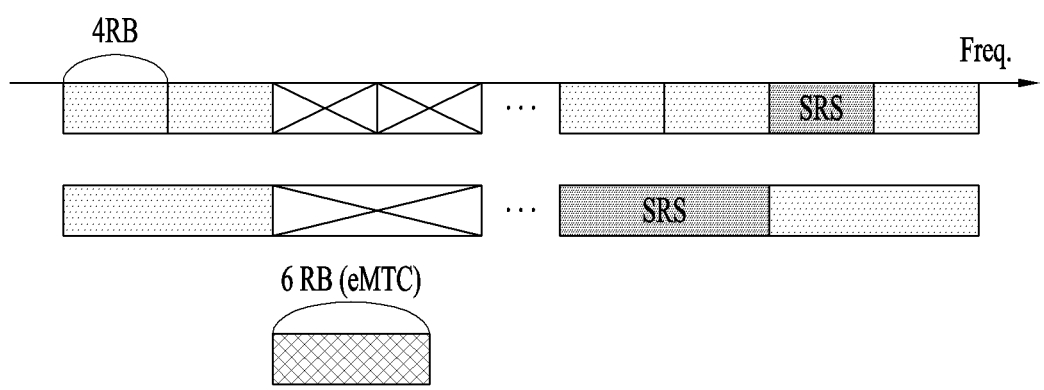
FIG. 10 is a diagram showing an example, to which a tenth method according to the present invention is applied.

FIG. 10 is a diagram showing an example, to which a tenth method according to the present invention is applied.

As shown in FIG. 10, when 40 RBs are allocated as sSRS system bandwidth, two 4-RB units including 6-RB narrowband in which eMTC operates may be excluded from the sSRS transmission resources. Alternatively, as shown in FIG. 10, when the length of the sSRS is 8 RBs, one 8-RB unit including 6-RB narrowband in which eMTC operates may be excluded from the sSRS transmission resources.

At this time, the UE may perform sSRS frequency hopping according to the virtual index as in (2) of the tenth method or follow a physical index and perform only sSRS frequency hopping supported on the sSRS transmission frequency resources.

3.3.6. Eleventh Method

The base station may inform the UE of information on time resources for sSRS transmission using the following methods.

(1) The base station may indicate a symbol index in which the sSRS will be transmitted within the sTTI through DCI or a higher layer signal.

(2) The base station may indicate an sSRS transmission time point through DCI. That is, when a current sTTI has an index n, the base station may indicate sSRS transmission in an sTTI having an index n+k through DCI. At this time, a value corresponding to k may be dynamically indicated.

If the wireless communication system supporting the sTTI and the legacy TTI according to the embodiment of the present invention supports aperiodic sSRS transmission, the UE needs to receive the position of an sTTI in which the sSRS will be transmitted from the base station through sSRS triggering DCI in order to perform aperiodic sSRS transmission.

In other words, the base station may indicate an offset value of the sTTI index, in which the sSRS will be transmitted, from the current sTTI index through DCI. At this time, a preferable sSRS symbol position may be changed according to the sTTI configuration in which the sSRS will be transmitted (e.g., the number of symbols in the sTTI, etc.). Accordingly, a method of informing, at the base station, the UE of the symbol index in the sTTI in which the sSRS will be transmitted through sSRS triggering DCI may be considered.

According to the above-described methods proposed in the present invention, the UE may transmit a sounding reference signal (SRS) through the following methods.

First, the UE determines the transmission time point of a first SRS in a first TTI based on the first TTI having a length smaller than one subframe.

At this time, the transmission time point of the first SRS may be fixed to the latest symbol in the time domain among the symbols included in the first TTI, as shown in FIGS. 7 and 8. Alternatively, the transmission time point of the first SRS may be indicated through downlink control information (DCI) or a higher layer signal received from the base station.

Subsequently, the UE transmits the first SRS at the transmission time point determined using the above-described method. Here, the frequency resource in which the first SRS is transmitted may be configured independently of the frequency resource in which a second SRS is transmitted based on a second TTI having a length corresponding to the length of one subframe.

Specifically, the frequency resource in which the first SRS is transmitted may not overlap the frequency resource in which the second SRS is transmitted.

In addition, when a modulated reference signal is further transmitted at the transmission time point of the first SRS, the first SRS and the modulated reference signal are cyclic-shifted, multiplexed and transmitted.

In addition, when the frequency resource in which the first SRS is transmitted includes a limited frequency band, the sequence of the first SRS included in the limited frequency band may be punctured and then transmission may be performed.

In addition, the first SRS may be frequency-hopped within the set SRS system bandwidth and then may be transmitted.

4. Device Configuration

Figure 11:
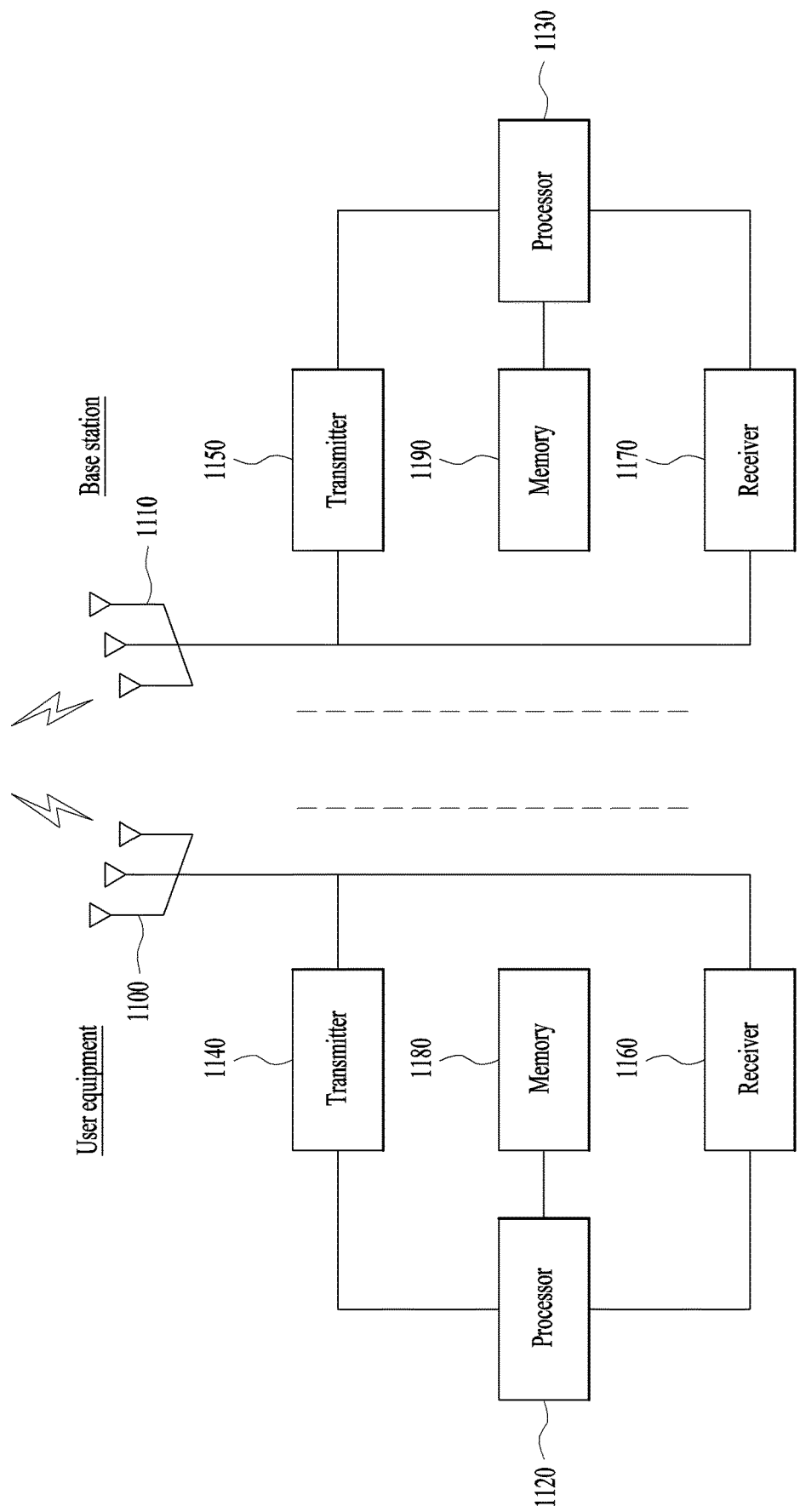
FIG. 11 is a diagram illustrating configurations of a UE and a base station capable of being implemented by the embodiments proposed in the present invention.

FIG. 11 is a diagram illustrating configurations of a UE and a base station capable of being implemented by the embodiments proposed in the present invention. The UE and the base station shown in FIG. 11 operate to implement the embodiments of the method of transmitting and receiving the sounding reference signal between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE receives first DL control information indicating whether a type of scheduling uplink signal transmission for one or more subframes corresponds to scheduling of a first type or scheduling of a second type from the base station via the processor 40. If the first DL control information indicates the scheduling of the first type, the UE can be configured to transmit an uplink signal in one or more subframes which are configured on the basis of the reception timing of the first DL control information. If the first DL control information indicates the scheduling of the second type, the UE can be configured to receive second DL control information indicating UL signal transmission for one or more subframes from the base station and transmit the uplink signal in one or more subframes which are configured on the basis of the reception timing of the second DL control information.

The base station transmits first DL control information indicating whether a type of scheduling uplink signal transmission for one or more subframes corresponds to scheduling of a first type or scheduling of a second type to the UE via the processor 140. If the first DL control information indicates the scheduling of the first type, the base station can be configured to receive an uplink signal in one or more subframes which are configured on the basis of the reception timing of the first DL control information. If the first DL control information indicates the scheduling of the second type, the base station can be configured to transmit second DL control information indicating UL signal transmission for one or more subframes to the UE and receive the uplink signal in one or more subframes which are configured on the basis of the reception timing of the second DL control information.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 11 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2680 or 2690 and executed by the processor 2620 or 2630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

The invention claimed is:

1. A method of transmitting a sounding reference signal (SRS) from a user equipment (UE) to a base station in a wireless communication system, the method comprising:
   determining a transmission time point of a first SRS within a first transmission time interval (TTI) based on the first TTI having a length smaller than that of one subframe; and
   transmitting the first SRS at the determined time point,
   wherein a frequency resource in which the first SRS is transmitted is configured independently of a frequency resource in which a second SRS is transmitted based on a second TTI having a length corresponding to that of one subframe.

2. The method according to claim 1, wherein the transmission time point of the first SRS is a latest symbol in a time domain among symbols included in the first TTI.

3. The method according to claim 1, wherein the transmission time point of the first SRS is indicated through downlink control information (DCI) or a higher layer signal received from the base station.

4. The method according to claim 1, wherein the frequency resource in which the first SRS is transmitted does not overlap the frequency resource in which the second SRS is transmitted.

5. The method according to claim 1, wherein, when a modulated reference signal is further transmitted at the transmission time point of the first SRS, the first SRS and the modulated reference signal are cyclic-shifted, multiplexed and transmitted.

6. The method according to claim 1, wherein, when the frequency resource in which the first SRS is transmitted includes a limited frequency band, a sequence of the first SRS included in the limited frequency band is punctured and then transmission is performed.

7. The method according to claim 1, wherein the first SRS is frequency-hopped within set SRS system bandwidth and then is transmitted.

8. A user equipment (UE) for transmitting a sounding reference signal (SRS) to a base station in a wireless communication system, the UE comprising:
   a receiver;
   a transmitter; and
   a processor connected to the receiver and the transmitter to operate,
   wherein the processor is configured to:
   determine a transmission time point of a first SRS within a first transmission time interval (TTI) based on the first TTI having a length smaller than that of one subframe; and
   transmit the first SRS at the determined time point, and
   wherein a frequency resource in which the first SRS is transmitted is configured independently of a frequency resource in which a second SRS is transmitted based on a second TTI having a length corresponding to that of one subframe.

9. The UE according to claim 8, wherein the transmission time point of the first SRS is a latest symbol in a time domain among symbols included in the first TTI.

10. The UE according to claim 8, wherein the transmission time point of the first SRS is indicated through downlink control information (DCI) or a higher layer signal received from the base station.

11. The UE according to claim 8, wherein the frequency resource in which the first SRS is transmitted does not overlap the frequency resource in which the second SRS is transmitted.

12. The UE according to claim 8, wherein, when a modulated reference signal is further transmitted at the transmission time point of the first SRS, the first SRS and the modulated reference signal are cyclic-shifted, multiplexed and transmitted.

13. The UE according to claim 8, wherein, when the frequency resource in which the first SRS is transmitted includes a limited frequency band, a sequence of the first SRS included in the limited frequency band is punctured and then transmission is performed.

14. The UE according to claim 8, wherein the first SRS is frequency-hopped within set SRS system bandwidth and then is transmitted.

\* \* \* \* \*